United States Patent [19]

Dragotinov

[11] 4,042,781

[45] Aug. 16, 1977

[54] APPARATUS FOR SYNCHRONIZING OSCILLATORS IN THE NETWORK NODES OF A DIGITAL TELECOMMUNICATIONS NETWORK

[75] Inventor: Alexander Dragotinov, Munich, Germany

[73] Assignee: Siemens Aktiengesellschaft, Munich, Germany

[21] Appl. No.: 708,009

[22] Filed: July 23, 1976

[30] Foreign Application Priority Data

July 25, 1975 Germany .............................. 2533463

[51] Int. Cl.² .............................................. H04J 3/06
[52] U.S. Cl. .............................................. 179/15 BS
[58] Field of Search ..................... 179/15 BS; 178/69.1

[56] References Cited

U.S. PATENT DOCUMENTS

| 3,869,579 | 3/1975 | Karl ................................. | 179/15 BS |
| 3,970,796 | 7/1976 | Gyurki ............................. | 179/15 BS |
| 4,002,839 | 1/1977 | Karl et al. ......................... | 179/15 BS |

Primary Examiner—Thomas A. Robinson

[57] ABSTRACT

A circuit arrangement is disclosed for synchronizing the oscillators of a digital telecommunications network. The network nodes of a PCM t.d.m. telecommunications network contain mutually synchronizing exchange pulse train oscillators. In each of the network nodes, a first pulse sequence is formed from the line pulse trains of the digital telecommunications lines in accordance with a pulse train frequency reduction factor. A second pulse sequence is formed in each of the network nodes by the exchange pulse train oscillator in accordance with the pulse train frequency reduction factor. Phase discriminators formed by logic-linking circuits are individually assigned and connected to the digital telecommunications lines. Phase differences between the first pulse sequence associated with the line pulse train and the second pulse sequence associated with the relevant exchange pulse train are detected by the phase discriminator. These detected phase difference signals can be combined in a sum or mean value circuit. As a result of these phase difference signals, a frequency regulating signal is generated which regulates the frequency of the exchange pulse train oscillator in each of the network nodes. In the circuit arrangement of this invention, the phase discriminator signal is maintained within a constant zone on both sides of a linear range. Each overshooting and undershooting of a $\pm n2\pi$ stage ($n = 0, 1, 2, \ldots N$) of the phase difference between the first sequence (the line pulse train pulse sequence) and the second sequence (the exchange pulse train pulse sequence) is digitally counted in a counting device with a counting volume N. A first special control input of the phase discriminator receives a first special control input which maintains the phase discriminator in a starting state corresponding to a phase difference of $+2\pi$. This first special control signal is generated when the counting device indicates that the count of the overshooting of the $+n2\pi$ stages exceeds the count of the undershooting of $+n2\pi$ stages. In like manner, second special control input of the phase discriminator receives a second special control signal which maintains the phase discriminator in a starting state corresponding to a phase difference of $-2\pi$. This second special control signal is generated when the counting device indicates that the count of the undershooting of $-n2\pi$ stages exceeds the count of the overshooting $-n2\pi$ stages.

7 Claims, 3 Drawing Figures

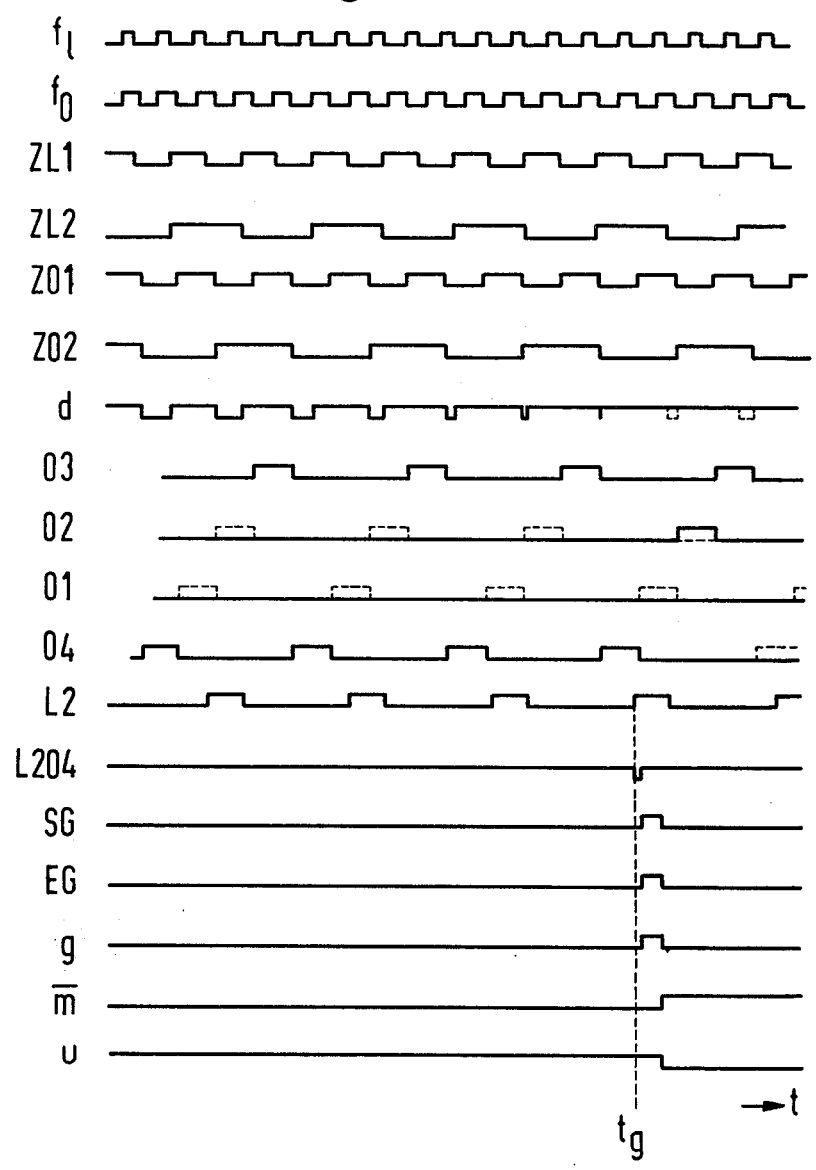

APPARATUS FOR SYNCHRONIZING OSCILLATORS IN THE NETWORK NODES OF A DIGITAL TELECOMMUNICATIONS NETWORK

BACKGROUND OF THE INVENTION

In digital telecommunications networks, in particular, PCM t.d.m. telecommunications networks in which pulse train oscillators are connected at the network nodes, one of the aims is to compensate for bit frequency differences between signals transmitted on various digital telecommunications lines leading to a network node, i.e., transmitted from various directions. Compensation for these differences is necessary for a satisfactory switch-through of telecommunications signals. Various methods for accomplishing compensation for bit frequency differences are known (see Proc. IEE, 113 (1966) 9, 1420 ... 1428 1421; Informationen Fernsprech-Vermittlungstechnik 5 (1969), 1, 48 ... 59, 51; NTF 42 (1972), 297 ... 310).

The first method is known as the asynchronous process in which each PCM t.d.m. exchange in a PCM t.d.m. telecommunications network possesses its own independent pulse generator. Accordingly, each receiving t.d.m. line opens into a so-called full store, the storage capacity of which corresponds to the number of bits in each pulse frame. The received binary words are stored in the full store until they fit into the pulse frame of the relevant PCM t.d.m. exchange, thereby simultaneously effecting a so-called frame compensation.

Another method is the quasi-synchronous process or so-called blind bit process in which the PCM t.d.m. exchanges of a PCM t.d.m. telecommunications network posses their own independent pulse generators, but the information bit frequency, i.e., the average number of information bearing bits per second, is rendered the same for all the PCM t.d.m. exchanges of the entire PCM t.d.m. telecommunications network. The differences which occur between the bit pulse train frequencies of the individual PCM t.d.m. exchanges and the uniform information bit frequency are compensated for by the insertion of so-called blind bits which are information free.

Other methods are also known for bit frequency compensation. In the servo-synchronous process also known as the homochronous process or the master slave process, a central pulse generator determines the bit frequency of the individual PCM t.d.m. exchanges of a PCM t.d.m. telecommunications network. Finally, in the autosynchronous process, the individual PCM t.d.m. exchanges posses individual pulse generators which are dependent on each other for mutual synchronization. For example, mutal synchronization is accomplished in accordance with the so-called phase averaging principle.

To this end, in a known manner, the t.d.m. lines incoming in the individual network nodes (exchanges or link regenerators) of a PCM t.d.m. telecommunications network are assigned line-individual phase discriminators. The inputs of these phase discriminators are each fed with a pulse sequence corresponding to the relevant line bit pulse train and with a pulse sequence corresponding to the exchange bit pulse train of the relevant network node. The output signals, which correspond to the particular phase shift between the relevant line pulse train and the exchange pulse train, combined via a sum or mean value forming element, form the regulating signal for the frequency regulation of the exchange pulse train oscillator. The above phase shift can be caused by different pulse train frequencies in the pulse train oscillators provided in the individual network nodes of the telecommunications network and/or by changes in line transit times. In this connection, it is well known (see ECJ 49 (1966) 11, 165) to use a pulse sequence corresponding to the relevant line bit pulse train or exchange bit pulse train with a pulse repetition frequency which is a sub multiple of the bit pulse train frequency. This can be accomplished in a manner (see NTZ 23 (1970) 5, 257 ... 261) which enables the use of pulse train extractors of flywheel circuits (a flywheel circuit is shown in FIG. 5 of the U.S. Pat. No. 3,483,330) on incoming PCM t.d.m. lines in the individual exchanges of a PCM t.d.m. telecommunications network. The line bit pulse trains of the individual incoming PCM t.d.m. lines are then obtained from the received PCM signals. The phase shifts of these line bit pulse trains are related to the exchange bit pulse train of the relevant exchange which regulates the pulse train oscillator supplying this exchange bit pulse train. The line bit pulse train and exchange bit pulse train are conducted to two pulse frequency reducers which commence the frequency reduction preferably displaced by 180° in relation to one another (reference phase new formation). A phase comparison is then effected between the output pulse sequences with the aid of a phase discriminator individually assigned to the lines in the form of a bistable trigger circuit. Because the d.c. mean value of the output signal of this trigger stage is (in a periodic function) proportional to the phase difference, it is thus proportional to the integral of the frequency difference, namely the difference between line pulse train frequency and exchange pulse train frequency. The output signals of all the trigger circuits assigned individually to the lines are added to form a mean value via generally identical resistors and are smoothed via an RC element. The capacitor voltage can then adjust the pulse train frequency of the exchange pulse train oscillator via a capacitance diode. The resetting flank of the exchange pulse train frequency reducer in each case acts upon so-called counting input of the individual trigger circuits; if a line pulse train breaks down, the associated trigger circuit operates as counter with a pulse interval ratio of 1:1. A regulating voltage is generated which corresponds to the identity of line pulse train frequency and exchange pulse train frequency.

It is also possible to use a plurality of the above methods and principles simultaneously. Thus, it is well known (see NTF 42 (1972) p. 306 and 307; German Pat. No. 1,766,477 = VPA 68/2479) that, in the individual network levels of a telecommunications network comprising a plurality of network levels and in the individual networks of a telecommunications network comprising a plurality of networks a mutual synchronization of the pule train oscillators may be accomplished in accordance with the auto-aynchronous process and direct synchronization may be accomplished between the various network levels and between the individual telecommunications networks via a plurality of supply lines in accordance with the servo-synchronous process.

Phase differences can also be determined with the aid of discriminators (see German AS 1,949,417 = VPA 69/2951) each of which possess logic-linking circuits provided with two inputs and one input. In each of these discriminators, one input is connected to the output of the particular line pulse train frequency reducer and the other input is connected to the input of the exchange pulse train frequency reducer. The output signals are linked via a sum- and mean value- circuit.

The operative characteristic of known phase discriminators, i.e., the dependence of the output signals on the phase differences in the input pulse sequences, is generally a $2\pi$ periodic function which increases within a $2\pi$ and a $\pm\pi$ range. It is stipulated that the pulse repetition frequency of the pulse sequences corresponding to the relevant line bit pulse train and exchange bit pulse train are subjected to the actual phase difference determination to the extent that their pulse repetition frequency represents a sub multiple of the bit pulse train frequency. Accordingly, it is endeavoured (see also ECJ 49 (1966) 11, 168) to ensure that phase differences are detected in the course of the frequency regulation process without the need for the discriminator operative point to depart from its original $2\pi$ (or $\pm\pi$) operative range. These phase differences are caused by both the existing frequency tolerances in the pulse train oscillators arranged in the network nodes (exchanges or link regenerators) of the t.d.m. telecommunications network and the expected transit time fluctuations on the t.d.m. lines connecting the network nodes in the t.d.m. telecommunications network.

Nevertheless, it is never possible to entirely rule out the possibility that the discriminator operative point will move away from the original $2\pi$ (or $\pm\pi$) range due to special circumstances. This can occur, for example, on account of a sufficient difference between the exchange pulse train frequencies of the exchange pulse train oscillator in a network node of a digital telecommunications network and an oscillator by which it is being externally synchronized. For example, the external oscillator may be located in a network node of a superordinated telecommunications network or a newly connected network node in one and the same digital telecommunications network. In such a case, the periodic curve for a discriminator or frequency regulator shows an extension of the build up time in which the synchronization is achieved, and in a reduction in the pull in range.

Circuit arrangements have been developed which have endeavored to reduce these undesired operating characteristics. For example, it is well known to adjust the frequency of an oscillator whose frequency can be altered in dependence upon a d.c. voltage within specific limits to an externally supplied frequency, where the externally supplied frequency and the frequency emitted from the oscillator are conducted to a phase comparison circuit. This phase comparison circuit emits a d.c. voltage fundamentally proportional to the frequency difference which is fed via a low pass filter to the oscillator for the purpose of frequency adjustment. In such circuits, an additional circuit arm is provided which when an extreme value of the voltage emitted from the phase comparator circuit is reached, stores this extreme value and conducts it to the oscillator until the latter has been regulated in its frequency to such an extent that the voltage emitted from the phase comparator circuit falls below its extreme value (see German OS 1,804,813). Here the phase comparator circuit is in the form of a bistable trigger circuit which, in dependency on whether the pulse arriving therein belongs to the pulse series which has been supplied from the exterior or has been emitted by the oscillator, emits two different voltages. Further bistable trigger stages are provided which control AND circuits for feeding the pulses to the phase comparator circuit in such manner that on the occurrence of a given phase difference between the pulses, the pulses are not permitted to pass. Two transit time elements whose transit time corresponds to the width of a pulse are arranged in such a way that further AND circuits are alternatively blocked or opened in dependence upon the phase difference between the pulses and/or delayed pulses of the other pulse series. The outputs of the further AND circuits are each connected to one input of the further bistable trigger stages. This known circuit arrangement has several disadvantages. On the one hand, this circuit is unable to rediscover its original $\pm\pi$ operative range once the phase difference has exceeded a quantity of $3\pi$; on the other hand, by the particular dimensioning of the transit time elements, it is limited to a specific width of the timing pulses which, at least in the case of long lines, requires the provision of additional pulse shapers.

Another known circuit arrangement (see Herold "Synchronization digitaler Fernmeldenetze durch Phasenmittelung mit Stellgroessenuebertragung" Dissertation TU Munich 31.1./2.3.1972, p. 112) exhibiting a discriminator operative curve possessing a constant range on both sides of a linear range, and whch is referred to as quasi-linear, has, in addition to the actual phase discriminator in the form of a bistable trigger circuit, an additional phase comparison circuit. When the thresholds $+\pi, +3\pi, +5\pi \ldots -\pi, -3\pi, -5\pi$ are exceeded, it emits a positive or negative pulse, where the number of the pulses is converted in a digital analog converter into a corresponding voltage. At the instant of switch on, this voltage is equal to zero. After a specific number of positive pulses, this voltage has a specific positive value and, only after the same number of negative pulses, again becomes zero (likewise for negative pulses). This voltage is fed to two threshold value circuits which, when they respond, block the one or the other input of the bistable trigger circuit so that the output signal remains at one of its two output values. This known circuit arrangement avoids the shortcomings of the previously mentioned circuit arrangement. However, it employs an analog technique which on the one hand requires a corresponding outlay in the form of a digital analog converter and on the other hand entails corresponding inaccuracies in respect of the threshold value elements based on the continuously finite width of the response thresholds.

SUMMARY OF THE INVENTION

The invention now shows a way in which the above mentioned shortcomings of known circuit arrangements can be avoided without the use of an analog technique for synchronizing oscillators in a digital telecommunications network. In particular, a PCM t.d.m. telecommunications network is shown in which mutually synchronizing exchange pulse train oscillators are arranged in the network nodes. It is possible with this invention to achieve a phase discriminator frequency regulation curve which exhibits a constant range on both sides of a given linear range, wherein it is always possible to rediscover the linear range.

The invention relates to a circuit arrangement for synchronizing oscillators in a digital telecommunications network, in particular, a PCM t.d.m. telecommunications network in which mutually synchronizing exchange pulse train oscillators are arranged in the network nodes, each network node containing pulse sequences corresponding to the line pulse trains of the incoming digital telecommunications lines in accordance with a pulse train frequency reduction factor and also a pulse sequence corresponding to the exchange pulse train in accordance with the pulse train frequency reduction factor. Phase discriminators are individually assigned and connected by logic circuits to the digital telecommunications lines. The phase discriminators determine phase differences between the pulse sequence corresponding to the relevant line pulse train and the pulse sequence corresponding to the exchange pulse train. A frequency regulating signal, which serves to frequency regulate the exchange pulse train oscillators is formed from the phase difference signals, possibly having been combined via a sum- or mean- value forming element.

The circuit arrangement of this invention achieves a phase discriminator or frequency regulation curve which exhibits a constant range on both sides of a given linear range. Each overshooting and undershooting of a $\pm n2\pi$ stage (with $n = 0, 1, 2, 3, \ldots N$) of the phase difference between the line pulse train pulse sequence and the exchange pulse train pulse sequence is digitally counted in a counting device possessing a counting volume $\pm N$. The logic linking circuit forming the phase discriminator is supplied via a special control input with a control signal which serves to maintain the logic linking circuit in a starting state corresponding to a phase difference of $+2\pi$. This control signal is supplied in the event of a counter result in the counting of the overshooting of $+n2\pi$ stages which exceeds the counting result obtained in the counting of the undershooting of $+n2\pi$ stages. Another control signal is supplied via a special control input in the event of a counter result obtained in the counting of the undershooting of $-n2\pi$ stages which exceeds the counting result obtained in the counting of the overshooting of $-n2\pi$ stages. This control signal serves to maintain the logic-linking circuit in the starting state corresponding to a phase difference of $-2\pi$.

The invention can be used in particular for the synchronization of oscillators in a digital telecommunications network, in particular a PCM t.d.m. telecommunications network having mutually synchronizing exchange pulse train oscillators arranged in the network nodes. According to the invention, oscillators in a possibly superordinate further telecommunications network may be mutually synchronized or the invention might also consist merely of one single network node or else one single oscillator. The invention provides the advantage that, without the outlay and the inaccuracies of an analog technique, in the event of a phase difference outside the linear range of the discriminator curve, the maximum and minimum linear range discriminator output signal is maintained constant. In the event of an oppositely directed phase difference, it is again possible to rediscover the original linear range. Thus, the invention accomplishes the desired shortening of the synchronization build-up processes and results in the increase in the pull-in range within a constantly defined position of the discriminator operative point. The invention uses digital switching means which also opens up the possibility of integrating these switching means. The digital counting in $\pm n2\pi$ stages of the phase difference also provides the advantage of being able to establish phase difference stages, in a relatively simple fashion, even with a pulse interval ratio which is not equal to 1:1. Likewise, a further advantage of the invention is that it is readily possible to commence counting from a zero phase difference at the middle of the linear range of the discriminator curve which covers a phase difference amount of $4\pi$, that is, with an average frequency regulation signal, to commence counting from phase differences of $\pm 2\pi$ at the ends of the linear range of the discriminator curve, i.e. with a minimum and maximum frequency regulation signal.

To this end, the invention also can be provided with a further embodiment. In this embodiment, the exchange pulse train pulse sequence and the line pulse train pulse sequence are each conducted to a pulse train frequency reducer with a frequency reduction ratio of 1:4. A comparator device connected to the pulse train frequency reducers establishes the coincidence of the end and the beginning of the individual exchange or line pulse train pulse periods. In each case there are four consecutive exchange and line pulse train pulse periods with the start and end of, in each case, a fourth line and exchange pulse train pulse period. A counting pulse output produces a counting pulse which indicates the overshooting and undershooting of a $n2\pi$ stage. This counting pulse is fed to the counting device. In a further development of the invention, the comparator device possesses logic-linking elements which are connected to the pulse train frequency reducers corresponding to the aforesaid pulse train pulse periods, and which, combined in pairs, lead to two 1-bit stores which are each reset with the exchange pulse train pulse sequence. Each of these are connected to two logic-linking elements which are alternately unlocked by the exchange pulse train frequency reducer for the duration of one exchange pulse train period. In each case a pair is formed with the corresponding logic-linking element conducted following the particular other 1-bit store. This leads to an output for counting pulses indicating the overshooting of a $n2\pi$ stage, and to an output for counting pulses indicating the undershooting of a $n2\pi$ stage. In a further development of the invention, the counting device can be in the form of a forwards-backwards counter which, in the one operating stage of a 1-bit store which is switched over when the counter zero state is reached, is controlled in the forwards direction by counting pulses corresponding to the overshooting of a $+n2\pi$ stage is controlled in the backwards direction by counting pulses corresponding to the undershooting of a $+n2\pi$ stage. In the other operating state of the 1-bit store, the counter is controlled in the forewards direction by counting pulses corresponding to the undershooting of a $-n2\pi$ stage and is controlled in the backwards direction by counting pulses corresponding to the overshooting of a $-n2\pi$ stage. A pulse suppression circuit can be used in each operating state to suppress the next synonymous counting pulse when the counter zero state has been reached.

BRIEF DESCRIPTION OF THE DRAWINGS

FIG. 3 shows signal curves of this circuit arrangement.

DETAILED DESCRIPTION OF THE INVENTION

Figure 1:
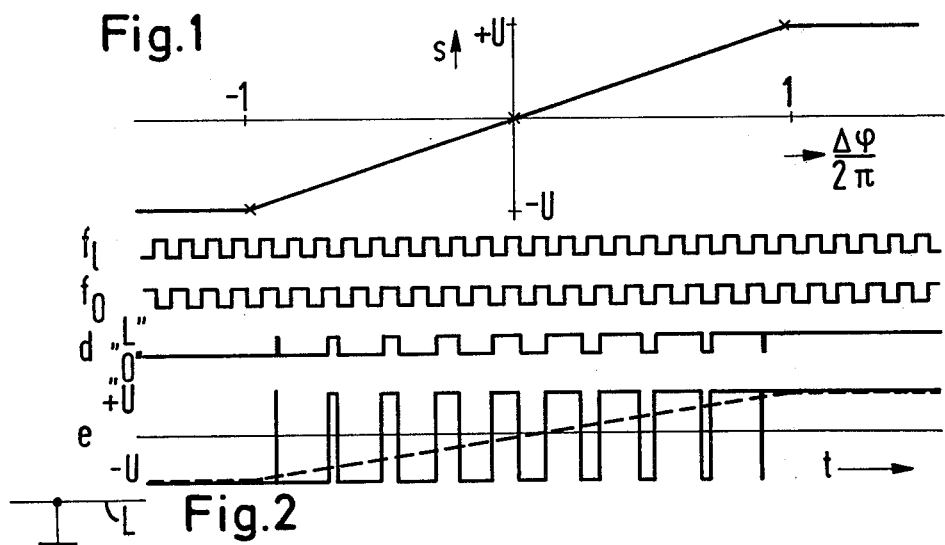
FIG. 1 shows a discriminator curve of a circuit arrangement corresponding to the invention and associated signal curves.

In its upper part, FIG. 1 illustrates the fundamental shape of the desired discriminator operative curve, that is, the output signal *s* (obtained following smoothing) which depends upon the phase difference $\Delta\Psi$ between two timing pulse sequences supplied at the input. The operative curve possesses a so-called linear range which extends from $\Delta\Psi = 2\pi$ to $\Delta\Psi = +2\pi$ and in which the output signal *s* is linearly dependent upon the phase difference $\Delta\Psi$ or at least increases monotonously therewith; on both sides of the linear range the operative curve possesses a so-called constant range in which the output signal *s* remains constantly at a value $+U$ and $-U$. FIG. 1 further shows a first timing pulse sequence $f_1$ which in the following will be referred to as the line pulse train pulse sequence and a second timing pulse sequence $f_o$ which in the following will be referred to as the exchange pulse train pulse sequence. Digital signal *d* in FIG. 1 corresponds to the relevant phase difference between the line pulse train pulse sequence and the exchange pulse train pulse sequence. Signal *d* is obtained in the actual phase difference determination in a circuit arrangement corresponding to the invention. This phase difference signal *d* is shifted to position symmetrical to the zero line as shown by signal *e* in FIG. 1. When this phase difference signal *e* has been smoothed, an output signal (shown in broken lines) is obtained which corresponds to the discriminator operative curve. Reference will also be made to the drawing in FIG. 1 in the explanation of the drawing of FIG. 2.

Figure 2:
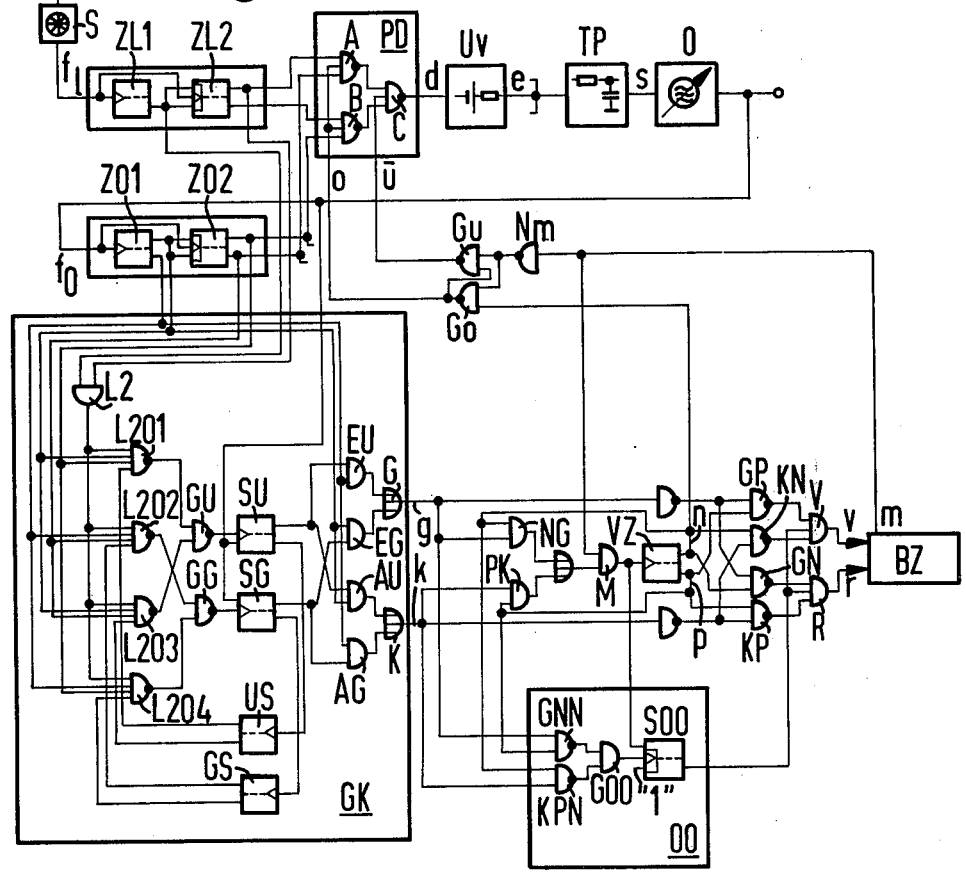
FIG. 2 shows an exemplary embodiment of a circuit arrangement corresponding to the invention.

FIG. 2 schematically illustrates an exemplary embodiment of a synchronizing circuit operating in accordance with the invention on a scale which is adequate for the understanding of the invention. This synchronizing circuit is used in an exchange of a PCM t.d.m. telecommunications network comprising further exchanges. This circuit contains an exchange pulse train oscillator O which will be assumed to be an auto-synchronized (phase averaging principle) by corresponding oscillators in such aforementioned further exchanges via t.d.m. lines leading from these further exchanges. Inasmuch as such a synchronization is effected using phase discriminators which are individually assigned to the lines and exhibit a discriminator curve which leads to a frequency regulation signal proportional to the phase difference between the relevant line pulse train and the exchange pulse train in a periodic function, this is not shown in particular in FIG. 2. This technique is well known (e.g. from the German AS 1,591,593 (VPA 67/3106), from NTZ 21 (1968) 9, 533, FIG. 2 and 534 FIG. 3, from NTZ 23 (1970) 5, 257 FIG. 1, from German Pat. No. 2,149,911 (VPA 71/6187) from German Pat. No. 2,247,666 (VPA 72/6180) and from LU Pat. 71,166 (VPA 74/6074). The circuit arrangement illustrated in FIG. 2, on the other hand, is based on the fact that the exchange pulse train oscillator O is to be synchronized by an incoming t.d.m. line L, not in accordance with a periodically repetitive linear discriminator and frequency regulation curve, but in accordance with a discriminator or frequency regulation curve which possesses a constant range on both sides of a linear range.

The line pulse train is obtained from the incoming t.d.m. line L which possibly effects the actual information signal transmission with the aid of a pulse train extractor S. Such a pulse train extractor can possess a pulse generator or a phase discriminator which regulates the latter and which AND links the signal elements L occurring on the incoming t.d.m. line with the generator pulse train and also the inverted generator pulse train, and by means of the logic-linking signals, controls the charging and discharging of a capacitor by which the pulse generator is then controlled in its pulse train phase to the middle phase state of the received PCM signal elements. Via a line $f_1$ connected to the output of the pulse train extractor, the line pulse train pulse sequence ($f_1$ in FIG. 1) is conducted to a pulse train frequency reducer ZL1 and ZL2 having a frequency reduction ratio 1:4. Correspondingly, via a line $f_o$ connected to the output of the exchange pulse train oscillator O, the exchange pulse train pulse sequence ($f_o$ in FIG. 1) is conducted to a pulse train frequency reducer ZO1 and ZO2 with the same frequency reduction ratio 1:4.

A phase discriminator PD, which possesses two NAND gates A and B linked via a third NAND gate C, will if one initially disregards the effects of special control signals with which it may be supplied at special control inputs *o* and *u* emit a digital signal corresponding to the relevant phase difference between the line pulse train pulse sequence and the exchange pulse train pulse sequence at its output *d*, as illustrated in line *d* in FIG. 1 and FIG. 3. With the aid of a subsequently connected pulse shaper Uv, this digital signal can be converted into a corresponding phase difference signal (*e* in FIG. 1) which runs symmetrically to the zero line, and which is then conducted to a low pass filter TP. This phase difference signal also can be linked with further phase difference signals via a summing and mean value circuit. The output signal (shown in broken lines in FIG. 1e) which occurs on the output line *s* of the low pass filter TP forms the frequency regulation signal which is to be supplied to the control input of the frequency regulated exchange pulse train oscillator.

The pulse train frequency reducers ZO1 and ZL2 are connected to a comparator device GK which establishes a coindence of the end and the beginning of the individual exchange pulse train pulse periods of in each case four consecutive exchange pulse train pulse periods with the beginning and end of in each case a fourth line pulse train pulse period. A counting pulse output *g*, *k* is produced which indicates the overshooting or undershooting of a n2 ζ stage. This counting pulse output is supplied to a counting device BZ and VZ. The input of the comparator device GK comprises NAND logic-linking elements L201, L202, L203 and L204 which, in accordance with the individual exchange pulse train pulse period of in each case four consecutive exchange pulse train pulse periods, are directly connected to the exchange pulse train frequency reducer ZO1 and ZO2. One of in each case four consecutive line pulse train pulse periods are connected via an AND gate L2 to the line pulse train frequency reducer ZL1 and ZL2. As a result, the logic-linking elements can only fulfill the coincidence condition when the relevant exchange pulse train pulse period coincides with the aforementioned line timing pulse period. Combined via a further NAND gate GU, the two NAND gates L201 and L203 lead to a 1-bit store SU whose resetting input is connected to the line $f_o$ carrying the exchange pulse train pulse sequence. When 1-bit store SU is reset, a 1-bit store US connected therewith is switched to a state which blocks one of the two NAND gates L201 and L203 previously prepared for the coincidence situation. The other of the two NAND gates L203 and L201 is unlocked. Combined via a further NAND gate GG, the two NAND gates L202 and L204 lead to a 1-bit store SG whose resetting input is connected to the line $f_o$ carrying the exchange pulse train pulse sequence. When 1-bit store SG is reset, a 1-bit store GS connected therewith is switched to a state which blocks one of the two NAND gates L201 and L203 previously prepared for the coincidence situation. The other of the two NAND gates L203 and L201 is unlocked.

At this point we shall consider the drawing in FIG. 3, which further illustrates the signal curves of the circuit arrangement shown in FIG. 2. Here firstly, lines $f_1$ and $f_o$ again show the course of a line pulse train pulse sequence and of an exchange pulse train pulse sequence. Line ZL1 shows the operating state of the reducer stage ZL1 of the line pulse train frequency reducer. Line ZL2 shows the operating state of the reducer stage ZL2. Lines ZO1 and ZO2 illustrate the operating states of the reducer stages ZO1 and ZO2 of the exchange pulse train frequency reducer. Line $d$ shows the course of the output signal of the phase discriminator PD of the circuit arrangement in FIG. 2. Lines 01, 02, 03, 04 illustrate the preparation of the logic-linking elements L201, L202, L203, L204 for the situation of coincidence, where a broken line pulse indicates that the relevant logic-linking element has been prepared for coincidence merely by the exchange pulse train frequency reducer, not however by the associated 1-bit store US, GS, whereas a solid line pulse indicates that the relevant logic-linking element has also been prepared by the associated 1-bit store US, GS for the situation of coincidence. As also shown in FIG. 3, lines 01, 02, 03, 04, the logic-linking elements L201, L202, L203, L204 each cover a different one of in each case four consecutive exchange pulse train pulse periods. Line L2 of FIG. 3 illustrates the determination of one of in each case four consecutive line timing pulse periods, as effected in the circuit arrangement shown in FIG. 2 with the AND gate L2 which is connected to the line pulse train frequency reducer stages ZL1 and ZL2 in accordance with this line pulse train pulse period. When in FIG. 3, a pulse illustrated in line L2 coincides in time with a pulse shown in solid lines in one of the lines 01, 02, 03, 04 the coincidence condition is fulfilled for the relevant NAND logic-linking element L201, L202, L203, L204. Under the conditions represented in FIG. 3, this is the case at the time $t_g$ for the NAND gate L204 in the circuit arrangement in FIG. 2. Line L204 in FIG. 3 shows the output signal which is emitted by the logic-linking element L204 in the circuit arrangement in FIG. 2 and with the rear flank of which the 1-bit store SG in the circuit arrangement in FIG. 2 is switched into its operative state. As also shown by line SG in FIG 3, the output signal SG remains until the beginning of the next exchange timing pulse.

The two 1-bit stores SU and SG are each connected to two logic-linking elements EU, AU and EG, AG which are alternately unlocked by the exchange pulse train frequency reducers ZO1 and ZO2 for the duration of one exchange pulse train pulse period. These logic-linking elements are in each case combined to form a pair with the corresponding logic-linking elements EG, AG, and EU, AU via further logic-linking elements G and K and these further logic-linking elements G and K lead to a counting output $g$ for counting pulses indicating the overshooting of a $n2\pi$ stage and to a counting output $k$ for counting pulses indicating the undershooting of a $n2\pi$ stage. The drawing in FIG. 2 illustrates that these are AND logic-linking elements combined in pairs by an OR logic linking-element; it is of course also possible to realize the same logic-linking function with the aid of other logic-linking elements such as NAND logic-linking elements as is the case for example with the logic-linking elements L201, L203, GU already discussed above.

At this point we again consider the drawing in FIG. 3. At the time $t_g$, a phase difference between line pulse train pulse sequence ($f_1$) and exchange pulse train timing pulse ($f_o$) has occurred due to an increasing phase shift. In relation to the starting state of the circuit arrangement of FIG. 2 as shown by FIG. 3, this phase difference is $2\pi$. As a result, coincidence occurs between the end of an exchange pulse train pulse period (line 04 in FIG. 3) and the beginning of a fourth line pulse train pulse period (line L2 in FIG. 3). The coincidence condition for the logic-linking element L204 (in FIG. 2) is fulfilled so that the latter emits an output signal (line L204 in FIG. 3) which activates the 1-bit store SG (in FIG. 2) until the beginning of the next exchange timing pulse (line SG in FIG. 3). At the same time, the 1-bit store GS is switched over so that the logic-linking element L204 is blocked and the logic-linking element L202 is prepared for coincidence condition. This is indicated in lines 02 and 04 of FIG. 3 by the continuous and broken line pulses. Under the conditions illustrated in FIG. 3, the activation of the 1-bit store SG, at the time $t_g$ results in a fulfillment of the coincidence condition for the logic-linking element EG (FIG. 3, line EG). Thus, a counting pulse indicating the overshooting of a $n2\pi$ stage occurs at the output $g$ of the comparator device GK (FIG. 3, line $g$).

Similarly, in the case of a further increasing phase shift between line pulse train pulse sequence ($f_1$) and exchange pulse train pulse sequence ($f_o$), coincidence occurs between the beginning of the particular fourth line pulse train pulse period represented in line L2 in FIG. 3 and the end of the particular next exchange pulse train pulse period indicated in line 03 in FIG. 3. In addition, coincidence occurs between the adjacent exchange pulse train pulse period indicated in line 02 in FIG. 3 and the adjacent exchange pulse train pulse period indicated in line 01 in FIG. 3 the coincidence condition being fulfilled in turn for the logic-linking elements L203, L202 and L201. As a result, the two 1-bit stores SU and SG are alternatively activated and the coincidence condition alternately occurs for the two logic-linking elements EU and EG. With the operation of these logic-elements EU and EG, a counting pulse indicating the overshooting of a $n2\pi$ stage is produced at the output $g$. For example, if a phase difference of a total of $5.2\pi$ exists in relation to the starting state, coincidence again occurs between the beginning of a line pulse train pulse period indicated in line L2 of FIG. 3 and the end of an exchange pulse train pulse period indicated in line 04 of FIG. 3, whereupon the processes above described are repeated.

The circuit arrangement in FIG. 2 operates in a similar manner in the case of an oppositely directed phase difference between the line pulse train pulse sequence and the exchange pulse train pulse sequence. With each completed $n2$ shift, coincidence occurs between the beginning of an exchange pulse train pulse period (lines 01, 02, 03, 04 in FIG. 4) and the end of in each case a fourth line pulse train pulse period (line L2 in FIG. 3). Again, the coincidence condition is met for the corresponding logic-linking element L201 to L204 which temporarily activates one of the following 1-bit stores SU or SG. As a result, the corresponding logic-linking element (L201 . . . L204) is simultaneously blocked and the particular other logic-linking element leading to the same 1-bit store (SU or SG) is unlocked. However, in contrast to the conditions described above with reference to the first directed phase difference, for the oppositely directed phase difference the logic-linking elements AU and AG are prepared by the first exchange pulse train frequency reducer stage ZO1 for the situation of coincidence rather than logic-linking elements EU and EG. A counting pulse indicating the undershooting of a $\pm n2\pi$ in each case occurs at the output $k$ of the comparator device GK.

The counting pulses occurring at the counting pulse outputs $g$ and $k$ of the comparator device GK are conducted to a forwards - backwards counter BZ in dependence upon the operating state of a 1-bit store VZ. The 1-bit store VZ is switched over whenever the counter zero state is reached. In the one operating state of the 1-bit store VZ, counting pulses occurring at the output $g$ and corresponding to the overshooting of a $+n2\pi$ stage pass to the forwards counting input $v$ of counter BZ and counting pulses occurring at the output $k$ and corresponding to the undershooting of a $+n2\pi$ stage pass to the backwards counting input $r$ of the forwards-backwards counter BZ. In the other operating state of the 1-bit store VZ, counting pulses occurring at the counting pulse output $k$ and corresponding to the undershooting of a $-n2$ stage pass to the forwards counting input $v$ of the counter BZ and counting pulses occurring at the counting pulse output $g$ and corresponding to the overshooting of a $-n2\pi$ stage pass to the backwards counting input $r$ of the forwards-backwards counter BZ. In the circuit arrangement shown in FIG. 2, this is achieved with the aid of four logic-linking elements GP, GN, KP, KN which each have two inputs, one of which always is connected to one of the two counting pulse outputs $g$ or $k$ of the comparator device GK and the other of which is connected to one of the two outputs $p$ or $n$ of the 1-bit store VZ. The outputs of these logic-linking elements GP, GN, KP and KN are combined in pairs via further logic-linking elements V and R which have outputs connected to the forwards counting input $v$ and to the backwards counting input $r$ of the forwards-backwards counter BZ. In the first described operating state of the 1-bit store VZ, the counting pulses occurring at the counting pulse output $k$ of the comparator device GK pass via an AND gate PK connected to the counting pulse output $k$ of the comparator device GK to an AND gate M which is connected in series with the switch-over input of the 1-bit store VZ. The output $p$ of the 1-bit store VZ is also connected to the input of AND gate PK. In the other operating state of the 1-bit store VZ, the counting pulses occurring at the counting pulse output $g$ pass via and AND gate NG connected to the counting pulse output $g$ of the comparator device GK to the AND gate M. The output $n$ of the 1-bit store VZ is also connected to the input of AND gate NG. The AND gate M is connected by its other input to the output $m$ of the forwards-backwards counter BZ. Output $m$ is in each case activated only in the counter zero state. Thus, the AND gate M is only able to transmit a counting pulse in the zero counting state, which counting pulse then switches over the 1-bit store VZ from its one operating state into its other operating state.

Relative to the discriminator curve shown in the upper part of FIG. 1, the forwards-backwards counter BZ counts $n2\pi$ stages of the phase difference $\Delta\Omega$ away from the zero point in the forwards direction and towards the zero point in the return direction. A pulse suppression circuit OO suppresses the following like-directed counting pulse whenever the counter zero state has been reached. In the circuit arrangement illustrated in FIG. 2, the pulse suppression circuit OO comprises two NAND gates GNN and KPN, one of which has one input connected to the output $g$ of the comparator device GK and the other input connected to the output $p$ of the 1-bit store VZ, the other of which has one input connected to the output $k$ of the comparator device GK and the input connected to the output $n$ of the 1-bit store VZ. The outputs of the NAND gates GNN and KPN are connected to the two inputs of an AND gate GOO, which is connected to the pulse train input of a bistable trigger circuit SOO. A so-called preparation input of the bistable trigger circuit SOO is constantly fed with a L signal. The output of this bistable trigger circuit SOO is connected to additional inputs of the aforementioned logic-linking elements V and R to enable elements V and R to emit forwards and backwards counting pulses. The bistable trigger circuit SOO is also connected by a resetting input to the output of the aforementioned AND gate M, so that, at the same time switch-over of the 1-bit store VZ occurs, the bistable trigger circuit SOO is in each case switched into the other operating state in which the logic-linking elements V and R are blocked for the particular occurring counting pulse. However, when the next like directed counting pulse occurs, the bistable trigger circuit SOO is again switched over into its original switching state, whereby the two logic-linking elements V and R are unlocked. As a result, the relevant counting pulse can reach the relevant input of the forwards-backwards counter BZ. In this connection, it should be noted that in order to compensate for pulse transit times in the logic-linking elements and bistable trigger circuits, it might be necessary to also provide correspondingly dimensioned transit time elements in the path of the counting pulses supplied to the logic-linking elements GP, KN, GN and KP.

The output $m$ of the forwards-backwards counter BZ, which is activated in the counter zero state, is connected via a negator Nm to the one input of a NAND gate Go. The other input of NAND gate Go to output $n$ of the 1-bit store VZ, which is activated during the forwards counting of the undershooting of $-n2\pi$ stages. The output of the NAND gate Go is connected to the special control input $o$, already mentioned above, of the phase discriminator PD. The output of further NAND gate Gu is connected to the special control input $u$ of the phase discriminator PD. One of the inputs of NAND gate Gu is connected to the output of the negator Nm and the other input is connected to the output of the NAND gate Go. The coincidence is fulfilled for one or the other of the two NAND gates Gu or Go whenever the forwards-backwards counter Bz is not in the counter zero state. Coincidence occurs for the NAND gate Gu whenever the forwards-backwards counter BZ counts the overshooting of $+n2\pi$ stages of the phase difference in the forwards direction and the undershooting of $+n2\pi$ stages of the phase difference in the backwards direction. For the NAND gate Go coincidence occurs whenever the forwards-backwards counter BZ counts the undershooting of $-n2\pi$ stages of the phase difference in the forwards direction and the overshooting of $-n\,2\pi$ stages in the backwards direction. The NAND gate Gu supplies the phase discriminator PD via its special control input $u$ with a control signal which maintains the phase discriminator PD in the starting state corresponding to a phase difference of $+2\pi$ by blocking the logic-linking elements A and B. The NAND gate Go supplies the phase discriminator PD via its special control input o with a control signal which maintains the phase discriminator PD in the starting state corresponding to a phase difference of $-2\pi$ by blocking the logic-linking element C.

In the case of a like-directed further increasing phase difference between line pulse train pule sequence and exchange pule train pulse sequence, the phase discriminator can be held in the relevant state until the counting device BZ has exhausted its counting volume N, whereupon the discriminator would again commence to emit an output signal corresponding to a phase shift O. In the opposite direction, where the discriminator operative point moves out of the constant range of the discriminator curve, in each case it moves back into its linear range as soon as the phase difference $\Delta\Omega$ between line pulse train pulse sequence and exchange pulse train pulse sequence undershoots by the amount of $2\pi$, whereupon the blocking signal previously supplied to the phase discriminator at its special control inputs o and u disappears.

In summary, the above described circuit arrangement achieves a phase discriminator and frequency regulation curve exhibiting a constant range on both sides of a linear range. In this circuit, overshooting and undershooting of a $\pm n2\pi$ stage (with $n = 0, 1, 2, 3 \ldots N$) of the phase difference between line pulse train pulse sequence $f_1$ and exchange pulse train pulse sequence $f_o$ is digitally counted in a counting device BZ having a counting volume N. A logic-linking circuit PD which forms the phase discriminator is supplied via a special control input u with a control signal which maintains the logic-linking circuit PD in the starting state corresponding to a phase difference $(\Delta\Omega)$ equal to $+2\pi$ when the count of the overshooting of $+n2\pi$ stages exceeds the count of the undershooting of $+n2\pi$ stages. Furthermore, the logic-linking circuit PD is supplied via a special control input o with a control signal which maintains the logic-linking circuit PD in the starting state corresponding to a phase difference $(\Delta\Omega)$ equal to $-2\pi$ when the count of the undershooting of $-n2\pi$ stages exceeds the count of the undershooting of $-n2\pi$ stages.

In a further development of the invention, it is also possible to digitally count every overshooting and undershooting of a $\pm n\pi$ stage or even every overshooting and undershooting of a $\pm n\pi/2$ stage of the phase difference between line pulse train pulse sequence and exchange pulse train pulse sequence. In this case, the logic-linking circuit which forms the phase discriminator can be supplied with a control signal which maintains the logic-linking circuit in the starting state corresponding to a phase difference of $+\pi$ and $+\pi/2$ when the count of the overshooting of $+n\pi$ stages and $+n\pi/2$ stages exceeds the count of the undershooting of $+n\pi$ stages and $+n\pi/2$ stages. Also, the phase discriminator can be supplied with a control signal which contains the logic-linking circuit in the starting stage corresponding to a phase difference of $-\pi$ or $-\pi/2$ when the count of the undershooting of $-n\pi$ stages and $-n\ \pi/2$ stages exceeds the count of the overshooting of $-n\pi$ stages and $-n\ \pi/2$ stages. This result can be accomplished with a circuit arrangement which fundamentally operates in the same way as the circuit arrangement shown in FIG. 2, but which is adjusted to phase difference stages of $\pm n\pi$ and $\pm \pi/2$.

Finally, it should be noted that the line pulse train pulse sequence $f_1$ and the exchange pulse train pulse sequence $f_o$ which are fed to the circuit arrangement shown in FIG. 2 can be formed by the frequency reduction of the actual line pulse train and exchange pulse train. In a known manner, corresponding pulse train reducers are inserted into the line leading from the pulse train regenerator S and into the line leading from the exchange pulse train oscillator O.

The principles of the invention are described hereinabove by describing in enabling details the construction and operation of alternative embodiments. It will be recognized that the specifically described forms of construction and operation can be modified or changed in a variety of ways known to those skilled in the art without departing from the scope of the invention, as defined by the appended claims.

I claim:

1. A circuit for mutually snychronizing a plurality of exchange pulse train oscillators in a PCM t.d.m. digital telecommunications network wherein one of said exchange pulse train oscillators is arranged in each of the network nodes of said telecommunications network, said circuit comprising in each network node:

a first frequency reducer connected to the incoming digital telecommunication lines for generating a first pulse sequence according to a given frequency reduction factor; said first pulse sequence corresponding to the line pulse train of said incoming digital telecommunication lines;

a second frequency reducer connected to the output of said exchange pulse train oscillator for generating a second pulse sequence according to said given frequency reduction factor, said second pulse sequence corresponding to the exchange pulse train generated by said exchange pulse train oscillator;

a phase discriminator connected to receive said first pulse sequence from said first frequency reducer and said second pulse sequence from said second frequency reducer, said phase discriminator comprising logic-linking circuits, whereby said phase discriminator generates a phase difference signal in response to the phase difference between said first pulse sequence and said second pulse sequence;

means connected to said phase discriminator for generating a frequency regulating signal in response to the phase difference signal generated by said phase discriminator, whereby said frequency regulating signal is used to frequency regulate said exchange pulse train oscillator contained in said network node;

means connected to said first and second frequency reducers for comparing said first and second pulse sequences and digitally counting each overshooting and each undershooting of a $-n2\pi$ ($n = 0, 1, 2, 3, \ldots N$) stage of the phase difference between said first pulse sequence and said second pulse sequence, said counting means having a counting volume N, said comparing and counting means providing said phase discriminator with a first special control input signal for maintaining said phase discriminator in a starting state corresponding to a phase difference of $+2\pi$ and a second special control input signal for maintaining said phase discriminator in a starting state corresponding to a phase difference of $-2\pi$, said first special control signal being generated by said counting means when the count of the overshooting of $+n2\pi$ stages of the phase difference exceeds the count of the undershooting of $+n2\pi$ stages, said second special control signal being generated by said counting means when the count of the undershooting of $-n2\pi$ stages of the phase difference exceeds the count of the overshooting of $-n2\pi$ stages, whereby the output phase difference signal of said phase discriminator enables said means for generating a regulating signal to generate a regulating signal within a constant zone on both sides of a linear range.

2. A circuit according to claim 1 wherein said first and second frequency reducers have a frequency reduction ratio of 1:4 and said comparing and counting means further comprises:

means for establishing the coincidence of the end and the beginning of individual pulse periods in each of four consecutive pulse periods of said first and second pulse sequences with in each case the beginning and end of a fourth pulse period of said first and second pulse sequences;

means connected to said coincidence means for generating a counting pulse which indicates the overshooting and undershooting of a $\pm n2\pi$ stage of the phase difference;

a counting device connected to said means for generating a counting pulse, whereby said counting device receives said counting pulse and sends an output signal to said phase discriminator.

3. A circuit according to claim 2 wherein said coincidence means further comprises:

four logic-linking means (L201, L202, L203, L204) individually connected to said first and second frequency reduces in a manner which enables each of said logic-linking elements to be associated with a different one of said four consecutive pulse periods;

means for combining said four logic-linking means in pairs, whereby each pair of said logic-linking elements provides one output signal;

said means for generating a counting pulse further comprising:

first and second 1-bit stores SU and SG each connected to receive one of said output signals from said combined logic-linking means, said 1-bit stores each being reset by said second pulse sequence;

a first group of two further logic-linking means (EU and EG) one of which (EU) is connected to said first store (SU) and the other of which (EG) is connected to said second store (SG), said first group being alternately unlocked by said second frequency reducer for the duration of a pulse period of said second pulse sequence, whereby said first group generates a counting pulse which indicates the overshooting of a $\pm n2\pi$ stage of the phase difference;

a second group of two further logic-linking means (AU and AG), one of which (AU) is connected to said first store (SU) and the other of which (AG) is connected to said second store (SG), said second group being alternately unlocked by said second frequency reducer for the duration of a pulse period of said second pulse sequence, whereby said second group generates a counting pulse which indicates the undershooting of a $\pm n2\pi$ stage of the phase difference.

4. A circuit according to claim 3 wherein said counting device is a forward-backwards counter (BZ) with two operating states and wherein said counting means further comprises a 1-bit control store connected to said forward-backwards counter for controlling the operating state of said forward-backwards counter, said 1-bit control store being switched over when the zero state of said forward-backwards counter is reached, whereby in said first operating state said counter is controlled in the forward direction by said counting pulse corresponding to the overshooting of a $+n2\pi$ stage and in the backwards direction by said counting pulse corresponding to the undershooting of a $+n2\pi$ 1 stage, and whereby in said second operating stage said counter is controlled in the forward direction by said counting pulse corresponding to the undershooting of a $-n2\pi$ stage and in the backwards direction by said counting pulse corresponding to the overshooting of a $-n2\pi$ stage.

5. A circuit according to claim 4 wherein said counting means further comprises a pulse suppression means for suppressing the subsequent like-directed one of said counting pulses whenever said forward-backwards counter reaches the zero state.

6. A circuit according to claim 1 wherein said counting and comparing means digitally counts each overshooting and each undershooting of a $\pm n\pi$(n = 1, 2, 3, ... N) stage of the phase difference between said first pulse sequence and said second pulse sequence whereby said counting and comparing means provides said pulse discriminator with a first special control input signal for maintaining said phase discriminator in a starting state corresponding to a phase difference of $+\pi$ and a second special control signal for maintaining said phase discriminator in a starting state corresponding to a phase difference of $-\pi$, said first special control signal being generated by said counting means when the count of the overshooting of $+n\pi$ stages of the phase difference exceeds the count of the undershooting of $+n\pi$ stages, said second special control signal being generated by said counting means when the count of the undershooting of $-n\pi$ stages of the phase difference exceeds the count of the overshooting of $-n\pi$ stages.

7. A circuit according to claim 1 wherein said counting and comparing means digitally counts each overshooting and each undershooting of a $\pm n\,\pi/2$ ($n = 1, 2, 3, ...$ N) stage of the phase difference between said first pulse sequence and said second pulse sequence, whereby said counting and comparing means provides said phase discriminator with a first special control input signal for maintaining said phase discriminator in a starting state corresponding to a phase difference of $+\pi/2$ and a second special control signal for maintaining said phase discriminator in a starting state corresponding to a phase difference of $-\pi/2$, said first special control signal being generated by said counting means when the count of the overshooting of $+n\,\pi/2$ stages of the phase difference exceeds the count of the undershooting of $+n\,\pi/2$ stages, said second special control signal being generated by said counting means when the count of the undershooting of $-n\,\pi/2$ stages of the phase difference exceeds the count of the overshooting of $-n\,\pi/2$ stages.

* * * * *